Nov. 16, 1926.

C. S. SAGE

RADIATOR

Filed May 2, 1923     2 Sheets-Sheet 2

1,607,171

INVENTOR
C. S. Sage
BY Howard P. Denison
ATTORNEY

Patented Nov. 16, 1926.

1,607,171

UNITED STATES PATENT OFFICE.

CHARLES S. SAGE, OF SYRACUSE, NEW YORK, ASSIGNOR, BY MESNE ASSIGNMENTS, TO THE BRIDGEPORT ROLLING MILLS, INC., OF STRATFORD, CONNECTICUT, A CORPORATION OF CONNECTICUT.

RADIATOR.

Application filed May 2, 1923. Serial No. 636,077.

This invention relates to a heat radiating apparatus for transferring heat from a heated medium container to the surrounding atmosphere for house heating and analogous purposes and, in its simplest form, involves the use of a conduit or container for receiving the heated medium such as hot water, steam or other heated fluent and a cellular heated conducting medium, preferably of diathermic character, receiving heat from the conduit or container and transferring it to the surrounding air in such manner as to order the direction of flow of the heated air through the cells.
The term "diathermic" is used to designate any material such as sheet copper, having the characteristics of rapid absorption and rapid radiation of the heat imparted thereto, so that when subjected to heat, the latter will be almost instantly diffused by absorption through the area of the heat transferring system and then, as instantaneously, impart it to the surrounding atmosphere, and the main object of the present invention is to cellularize the diathermic elements in such manner as to order the direction of flow of the heated air as may be required for the particular use to which the apparatus is put.
One of the specific objects is to concentrate and direct the flow of heated air through the cells into a room for heating purposes, with a minimum loss of radiation.

Another object is to obtain a relatively large amount of radiating surface in a comparatively small compact space, and at the same time to greatly reduce the weight of the apparatus for a given area of radiation.

Other objects and uses relating to specific parts of the heat exchange system will be brought out in the following description.

In the drawings:—

Figure 1:
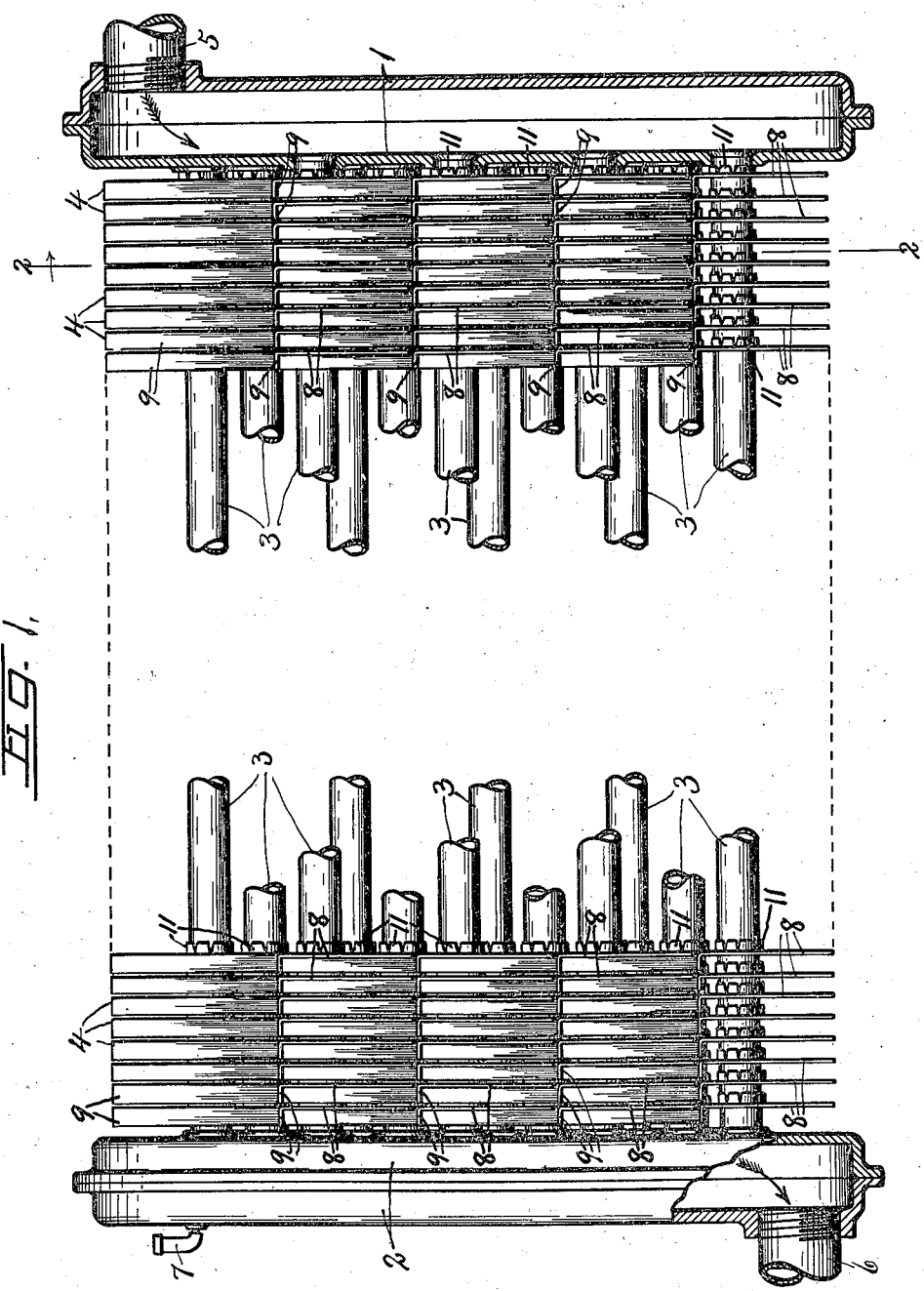
Figure 1 is a front elevation, partly in section and partly broken away, of a heat exchange apparatus embodying the various features of my invention as used more particularly for house heating.
Figure 2:
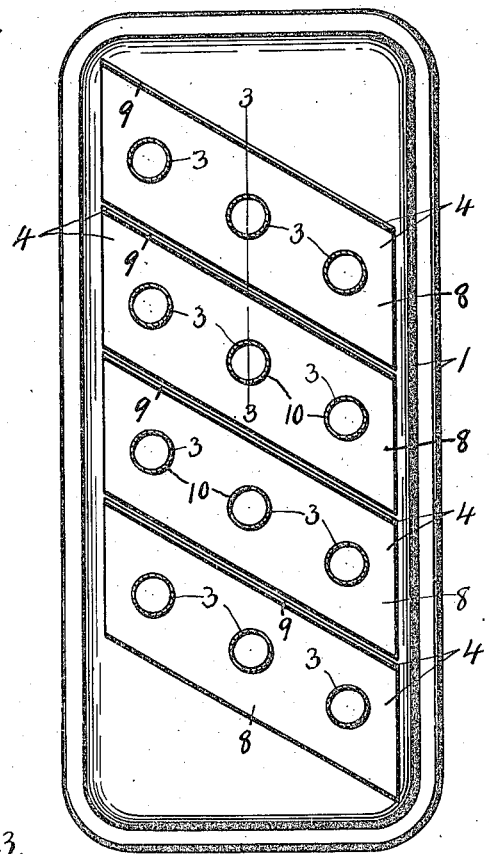
Figure 2 is a transverse vertical sectional view taken on line 2—2, Figure 1.
Figure 3:
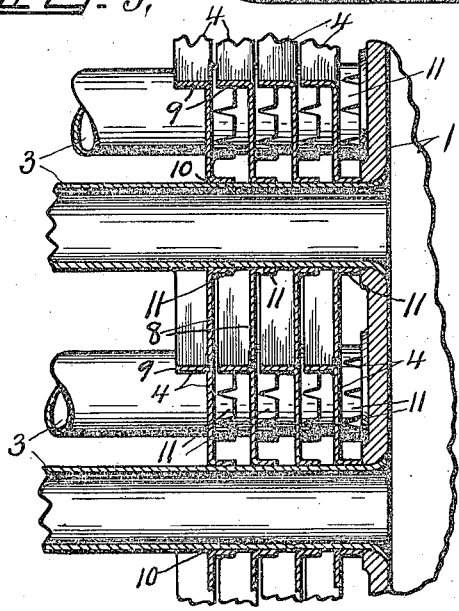
Figure 3 is an enlarged vertical sectional view of a portion of the device taken on line 3—3, Figure 2 except that the outer portion of the adjacent end manifold is broken away.
Figure 4:
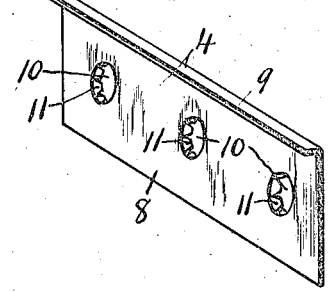
Figure 4 is a perspective view of one of the detached diathermic units.

As illustrated, this apparatus comprises an upright intake manifold —1—, an upright outlet manifold —2— connected by a system of horizontally extending pipes or tubes —3— which are preferably arranged in sets of, in this instance, three each, each set carrying a multiplicity of diathermic units —4— of thin sheet copper or equivalent material having a high degree of heat conductivity and also having the characteristics of rapid absorption, diffusion and radiation of heat imparted thereto.

The manifolds —1— and —2— and tubes —3— are adapted to receive steam, hot water or any other heated circulating fluid capable of being used for heating purposes, the inner walls of the manifolds being perforated to receive the adjacent ends of the tubes —3— which are preferably expanded therein and may be brazed, soldered or otherwise secured to said walls to form air and water-tight joints therewith, the outer walls of said manifolds being preferably made separately from the inner walls, but secured thereto around their marginal edges by welding or other suitable fastening means to form non-leakable joints thus permitting the ends of the tubes —3— to be firmly secured to their respective inner walls before the outer walls are secured in place.

The outer wall of the intake manifold —1— is provided near its upper end with an intake pipe —5— adapted to be connected to any available source of steam or hot water supply and may be provided with the usual valve for controlling said supply.

The outer wall of the other manifold —2— is provided near its lower end with an outlet pipe —6— which may lead to another radiator or may be returned to the source of steam or hot water supply and may also be provided with the usual valve for controlling said outlet, the upper end of said outlet manifold being provided with an air vent valve —7— to prevent the formation of partial vacuum in the system and thereby to assist the free flow of the heating fluid through the piping system.

The heat-transferring units —4— are identical in construction in that each consists of an angle plate of thin sheet copper or equivalent diathermic material having a substantially flat main body —8— and a relatively narrow flange —9— along one of its longitudinal edges and at substantially right angles to the main body which latter is provided with a plurality of, in this instance, three transverse circular openings —10— in equal longitudinally spaced relation and of uniform diameter for receiving one set of the tubes —3— and forming tight joints therewith, each opening being surrounded by a marginal flange —11— projecting from one and the same side preferably opposite that of the flange —9— to form axially elongated bearings for said tubes and thereby to hold the plates in planes at substantially right angles to that of the main body.

These plates —4— are successively assembled upon their respective sets of tubes with their main bodies in uniformly spaced relation corresponding approximately to the width of the flanges —9— which extend in the same general direction from said main bodies and are disposed in the same flat plane when the plates are assembled upon their corresponding sets of tubes.

That is, the plates on each set of tubes are arranged in parallelism with their flanges uppermost while the tubes —3— of the several sets are also arranged in parallelism both transversely and longitudinally and in uniformly spaced relation vertically corresponding approximately to the vertical height of the plates so that when several sets of tubes are placed in operative position in their respective manifolds, the flanges —9— of each set will lie in close proximity to the lower edges of the main bodies of the next superimposed set and the corresponding plates of the several sets will lie in substantially the same transverse vertical planes.

The tubes of the several sets are disposed in parallel planes inclined upwardly from one side of the radiator toward the opposite side at an angle of, in this instance, approximately 30° from a horizontal plane and inasmuch as the plates —4— are of uniform width, and that the tubes of each set are passed through the longitudinal centers thereof, it is evident that the plates of each set will also be inclined in the same direction and at the same angle, but it will be noted that the end edges of the several plates are disposed in parallel vertical planes slightly within the marginal edges of the manifolds —1— and —2— so that when assembled in a manner described, they produce a cellular structure with substantially flat front and rear faces in which the cells extend transversely of the radiator in inclined planes corresponding to those of the several sets of tubes and plates mounted thereon, the cells being bounded by the main bodies and flanges of the plates.

That is, the main body of each plate forms a dividing wall between adjacent cells while the top flange of each plate forms the top wall of the corresponding cell and a dividing wall between adjacent cells, so that the walls of each cell are of single thickness and thereby greatly increase the rapidity of the transfer of the heat from the tubes to the air within the cells.

The several cells are, therefore, open at both ends or from front to rear which allows the colder strata of air to enter the lowermost ends of the cells and to be heated in transit therethrough. The heated air may readily flow forwardly and upwardly therethrough by its natural buoyancy and expansive force and at the same time, increasing in temperature as it emerges from the higher ends of the cells.

Each set of tubes —3— with its plates —4— mounted thereon constitute a unitary heat exchange section of the radiator while each cell constitutes a conduit for receiving the cold air at the low end and discharging the heated air at the higher end, and it is therefore evident that when the several sections are assembled in the manner described, it affords a relatively large number of cells and a corresponding large radiating area in a comparatively small space, and that by making these plates of diathermic material such as thin sheet copper with the dividing walls between the several cells of single thickness the heat is absorbed by and diffused over the entire area of the plates and is instantly transferred to the surrounding air which immediately expands and circulates upwardly through the higher open ends of the cells where it is discharged with considerable force while taking in the cold air at the lower ends of the cells.

It is also evident by this arrangement of the plates upon the tubes and the inclination of the tubes and plates of the several sections, that the walls of the cells serve to order and to direct the flow of the air through the radiator and to discharge the heated air at the higher ends of the cells, thus permitting the radiator to be set in such position as to produce an orderly direction of the heated air into the room where desired or where it is most efficient for heating purposes.

In practice, it is customary to set these radiators near the wall of the room with the lower ends of the cells facing the wall so that the colder air will enter the lower ends of the cells and will be gradually heated in transit therethrough, and the heated air discharged into the room in an upwardly inclined direction which has proven to be the most efficient for heating the air in the room.

The plates —4— may be rapidly stamped to the desired form with the openings —10— therein in a suitable press similar to that set forth in my pending application, Serial Number 646,366 filed June 19, 1923, which enables them to be assembled in properly spaced relation upon a suitable comb or support.

After the proper number of plates have been assembled on the comb, the latter with the plates thereon is removed from the machine and the tubes —31— which have been previously cut to the desired length and coated with solder are then forced through the registering openings —10— whereupon the tubes with the plates thereon are removed from the comb and the entire assembly subjected to sufficient heat to melt the solder and thereby to secure the plates to the tubes.

Each section of the radiator is built up in this manner and as the plates have been assembled in the manner just described upon the tubes of a sufficient number of sections, the sections are then secured in place to the manifolds in the manner previously described. Reference is hereby made to my Patent No. 1,516,893, November 25, 1924, and also to my copending application, Serial No. 719,073, filed June 10, 1924.

I claim:

1. In a heat exchange apparatus, a set of horizontally extending tubes, and a set of sheet metal fins arranged edgewise vertically in the tubes in parallel spaced relation and provided with top flanges projecting across adjacent spaces, said spaces being open at the bottom and at both ends, said flanges being disposed in longitudinally inclined planes.

2. In a heat transfer apparatus, hollow upright end heads in spaced relation and a set of horizontally extending tubes connecting said heads, in combination with a set of sheet metal fins arranged edgewise vertically on the tubes and provided with top flanges projecting across adjacent spaces to form cells, said cells being open at the bottom and at both ends.

3. In a heat transfer apparatus, hollow upright end heads in spaced relation and a set of horizontally extending tubes connecting said heads, in combination with a set of sheet metal fins arranged edgewise vertically on the tubes and provided with top flanges projecting across adjacent spaces to form cells, said cells being open at the bottom and at both ends, the flanges being disposed in longitudinally inclined planes.

In witness whereof I have hereunto set my hand this 23d day of April, 1923.

CHARLES S. SAGE.